US012570252B2

(12) United States Patent
Inada et al.

(10) Patent No.: US 12,570,252 B2
(45) Date of Patent: Mar. 10, 2026

(54) BRAKE SYSTEM OF SADDLE-TYPE VEHICLE

(71) Applicant: Honda Motor Co., Ltd., Tokyo (JP)

(72) Inventors: Kyosuke Inada, Tokyo (JP); Hiroyuki Kaneta, Tokyo (JP); Tsubasa Nose, Tokyo (JP); Yuta Kanbe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 453 days.

(21) Appl. No.: 18/277,698

(22) PCT Filed: Dec. 17, 2021

(86) PCT No.: PCT/JP2021/046855
§ 371 (c)(1),
(2) Date: Aug. 17, 2023

(87) PCT Pub. No.: WO2022/185671
PCT Pub. Date: Sep. 9, 2022

(65) Prior Publication Data
US 2024/0123955 A1 Apr. 18, 2024

(30) Foreign Application Priority Data
Mar. 4, 2021 (JP) ................................. 2021-034319

(51) Int. Cl.
B60T 8/17 (2006.01)
B60T 8/26 (2006.01)
(52) U.S. Cl.
CPC ............ B60T 8/1706 (2013.01); B60T 8/261 (2013.01)
(58) Field of Classification Search
CPC ............................... B60T 8/1706; B60T 8/261
(Continued)

(56) References Cited

U.S. PATENT DOCUMENTS

2017/0305432 A1* 10/2017 Nemoto .............. B60W 40/105
2019/0283772 A1 9/2019 Ishisaka et al.
(Continued)

FOREIGN PATENT DOCUMENTS

JP 2019-156297 A 9/2019
JP 2019-209917 A 12/2019
WO WO 2019/131504 A1 2/2021

OTHER PUBLICATIONS

Japanese Notice of Reasons for Refusal for Japanese Application No. 2023-503393, dated Jan. 9, 2024, with an English translation.
(Continued)

*Primary Examiner* — Christopher P Schwartz
(74) *Attorney, Agent, or Firm* — Birch, Stewart, Kolasch & Birch, LLP

(57) ABSTRACT

To provide a brake system for a saddled vehicle that ensures vehicle's stable behavior when a brake operating element is operated during automatic control. A brake system for a saddled vehicle includes: a control device exerting automatic control over a brake fluid pressure; and a front-wheel brake operating element and a rear-wheel brake operating element for a driver to manually operate a front-wheel brake and a rear-wheel brake. When an operation force is applied to at least one of the front-wheel brake operating element and the rear-wheel brake operating element while the front-wheel brake and the rear-wheel brake are under automatic control of the control device, if a brake fluid pressure corresponding to the operation force is less than a brake fluid pressure generated by the automatic control, the control device maintains the automatic control, and if a brake fluid pressure corresponding to the operation force is equal to or greater than a brake fluid pressure generated by the automatic control, the control device cancels the automatic
(Continued)

control and generates the brake fluid pressure corresponding to the operation force.

5 Claims, 11 Drawing Sheets

(58) Field of Classification Search
USPC ............................................. 303/9.64, 9.65
See application file for complete search history.

(56) References Cited

U.S. PATENT DOCUMENTS

| | | | |
|---|---|---|---|
| 2019/0375382 A1 | 12/2019 | Nakatsuka et al. | |
| 2020/0391732 A1 | 12/2020 | Kaneta et al. | |
| 2021/0107491 A1* | 4/2021 | Atsushi ................. | B62K 11/00 |
| 2024/0123956 A1* | 4/2024 | Kaneta ................. | B60T 8/1706 |
| 2024/0227753 A9* | 7/2024 | Nose .................... | B60T 15/043 |

OTHER PUBLICATIONS

International Search Report, issued in PCT/JP2021/046855, PCT/ISA/210, dated Mar. 1, 2022.

\* cited by examiner

BRAKE SYSTEM OF SADDLE-TYPE VEHICLE

FIELD

The present invention relates to a brake system for a saddled vehicle, and in particular, to a brake system for a saddled vehicle that enables automatic control according to information from various sensors.

BACKGROUND

Conventionally, in a brake system that enables automatic control according to information from various sensors, a configuration of accepting an operational intervention by a brake operating element during automatic control is known.

Patent Literature 1 discloses a brake system that operates as follows. During automatic brake system control, if a brake operating element is operated by an operation force greater than a predetermined threshold value, the system generates a brake fluid pressure smaller than that corresponding to the operation force.

CITATION LIST

Patent Literature

Patent Literature 1: JP 2019-156297 A

BRIEF SUMMARY

Technical Problem

Here, if the system is configured to cancel automatic control in response to an operation on the brake operating element during the automatic brake system control irrespective of the magnitude of the operation force, a small operation force on the brake operating element will reduce the braking force. This may negatively impact the vehicle's behavior.

An object of the present invention is to provide a brake system for a saddled vehicle that solves the conventional problem and maintains vehicle's stable behavior when the driver operates a brake operating element during automatic control.

Solution to Problem

In order to achieve the object, a first aspect of the present invention provides a brake system for a saddled vehicle, including: a control device (70) exerting automatic control over a brake fluid pressure of a brake (BF, BR) according to various information; and a brake operating element (50, 60) for a driver to manually operate the brake (BF, BR). When an operation force is applied to the brake operating element (50, 60) while the brake (BF, BR) is under the automatic control, if a brake fluid pressure corresponding to the operation force is less than a brake fluid pressure generated by the automatic control, the control device (70) maintains the automatic control, and if a brake fluid pressure corresponding to the operation force is equal to or greater than a brake fluid pressure generated by the automatic control, the control device (70) cancels the automatic control and generates the brake fluid pressure corresponding to the operation force.

A second aspect of the present invention provides a brake system for a saddled vehicle, including: a control device (70)

exerting automatic control over a brake fluid pressure of a front-wheel brake (BF) and a brake fluid pressure of a rear-wheel brake (BR) according to various information; and a front-wheel brake operating element (50) and a rear-wheel brake operating element (60) for a driver to manually operate the front-wheel brake (BF) and the rear-wheel brake (BR). When an operation force is applied to at least one of the front-wheel brake operating element (50) and the rear-wheel brake operating element (60) while the front-wheel brake (BF) and the rear-wheel brake (BR) are under the automatic control, if a brake fluid pressure corresponding to the operation force is less than a brake fluid pressure generated by the automatic control, the control device (70) maintains the automatic control, and if a brake fluid pressure corresponding to the operation force is equal to or greater than a brake fluid pressure generated by the automatic control, the control device (70) cancels the automatic control and generates the brake fluid pressure corresponding to the operation force.

In a third aspect of the present invention, when a predetermined condition for canceling automatic control is met while the automatic control is maintained, the control device (70) cancels the automatic control while gradually reducing the brake fluid pressure.

In a fourth aspect of the present invention, in canceling the automatic control by the vehicle being traveling in a turn during automatic control, the control device (70) reduces the brake fluid pressure of the front-wheel brake (BF) slower than the brake fluid pressure of the rear-wheel brake (BR).

Advantageous Effects

According to the first aspect, a brake system for a saddled vehicle includes: a control device (70) exerting automatic control over a brake fluid pressure of a brake (BF, BR) according to various information; and a brake operating element (50, 60) for a driver to manually operate the brake (BF, BR). When an operation force is applied to the brake operating element (50, 60) while the brake (BF, BR) is under the automatic control, if a brake fluid pressure corresponding to the operation force is less than a brake fluid pressure generated by the automatic control, the control device (70) maintains the automatic control, and if a brake fluid pressure corresponding to the operation force is equal to or greater than a brake fluid pressure generated by the automatic control, the control device (70) cancels the automatic control and generates the brake fluid pressure corresponding to the operation force. If the system canceled the automatic control in response to an operation on the brake operating element, even a small operation force would reduce the braking force, which may negatively impact the vehicle's behavior. Here, the system of the present invention maintains the automatic control if the operation force is small, thus ensuring vehicle's stable behavior. Also, if the operation force is large, the system provides the braking force corresponding to the operation force.

According to the second aspect, a brake system for a saddled vehicle, including: a control device (70) exerting automatic control over a brake fluid pressure of a front-wheel brake (BF) and a brake fluid pressure of a rear-wheel brake (BR) according to various information; and a front-wheel brake operating element (50) and a rear-wheel brake operating element (60) for a driver to manually operate the front-wheel brake (BF) and the rear-wheel brake (BR). When an operation force is applied to at least one of the front-wheel brake operating element (50) and the rear-wheel brake operating element (60) while the front-wheel brake (BF) and the rear-wheel brake (BR) are under the automatic control, if a brake fluid pressure corresponding to the operation force is less than a brake fluid pressure generated by the automatic control, the control device (70) maintains the automatic control, and if a brake fluid pressure corresponding to the operation force is equal to or greater than a brake fluid pressure generated by the automatic control, the control device (70) cancels the automatic control and generates the brake fluid pressure corresponding to the operation force. If the system canceled the automatic control in response to an operation on the brake operating element, even a small operation force would reduce the braking force, which may negatively impact the vehicle's behavior. Here, the system of the present invention maintains the automatic control if the operation force is small, thus ensuring vehicle's stable behavior. Also, if the operation force is large, the system provides the braking force corresponding to the operation force.

According to the third aspect, when a predetermined condition for canceling automatic control is met while the automatic control is maintained, the control device (70) cancels the automatic control while gradually reducing the brake fluid pressure. Thus, the braking force will not be reduced by the satisfaction of a predetermined condition for canceling automatic control while the automatic control is maintained. This ensures vehicle's stable behavior.

According to the fourth aspect, in canceling automatic control by the vehicle being traveling in a turn during automatic control, the control device (70) reduces the brake fluid pressure of the front-wheel brake (BF) slower than the brake fluid pressure of the rear-wheel brake (BR). Thus, since the brake fluid pressure of the front-wheel brake is reduced slower, the ground load of the front wheel is preserved. Also, since the brake fluid pressure of the rear-wheel brake is reduced faster, the drive is quickly transmitted. These features make it easier for the driver to perform lane changes and other avoidance maneuvers.

DETAILED DESCRIPTION

Figure 1:
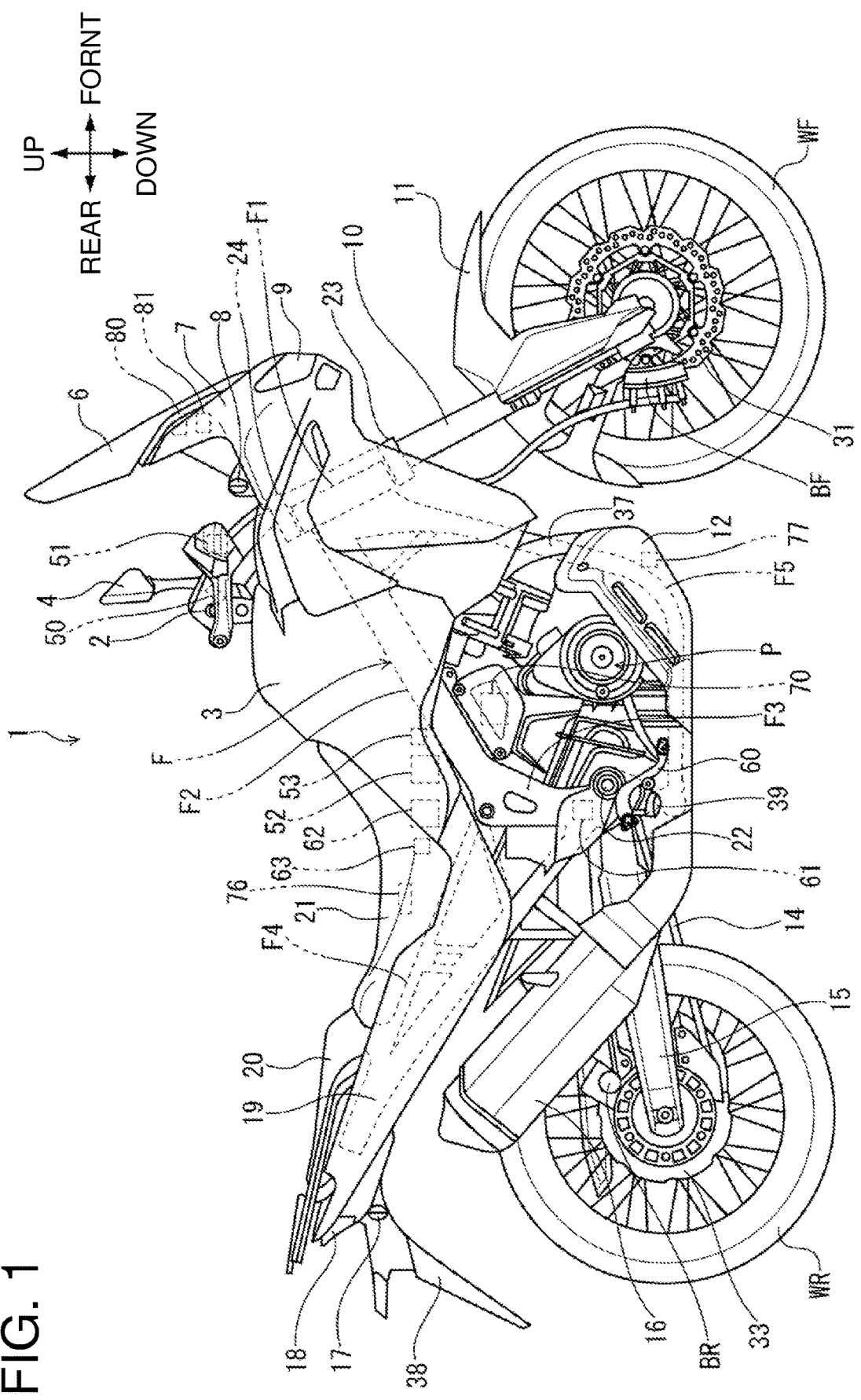
FIG. 1 is a right side view of a motorcycle to which a brake system according to one embodiment of the present invention is applied.

In the following, with reference to the drawings, a detailed description will be given of a preferred embodiment of the present invention. FIG. 1 is a right side view of a motorcycle 1 to which a brake system according to one embodiment of the present invention is applied. The motorcycle 1 is a saddled vehicle including a power unit P that transmits drive to a rear wheel WR via a drive chain 14. A head pipe F1 positioned at the front end of a vehicle body frame F swingably holds a not-shown steering stem. A bottom bridge 23 and a top bridge 24, fixed to the top and bottom of the steering stem, hold a pair of right and left front forks 10.

Steering handlebars 2 holding a pair of right and left rearview mirrors 4 are mounted on the top of the top bridge 24. A brake lever 50, i.e., a front-wheel brake operating element, is mounted on the right one of the steering handlebars 2. On the front forks 10, a front-wheel brake caliper BF, i.e., a front-wheel brake that applies braking force to a front-wheel brake disc 31 rotating in synchronization with a front wheel WF, and a front fender 11 are mounted.

On the rear of the head pipe F1, a pair of right and left main frames F2 extending diagonally downward rearward and an underframe F5 extending downward are mounted. The underframe F5 holds the power unit P from below. The main frames F2 have their rear ends coupled to a pivot frame F3 including a pivot 22 swingably holding a swingarm 15. The pivot frame F3 has its lower end coupled to the rear end of the underframe F5. A pair of right and left foot steps 39 for receiving the driver's feet are mounted on the pivot frame F3.

Surrounded and held by the main frames F2 and the underframe F5, the power unit P transmits its drive to the rear wheel WR via the drive chain 14. An underguard 12 is mounted on the bottom frontward side of the power unit P. Through an exhaust pipe 37 extending inner than the underguard 12, the power unit P sends out exhaust gas to a muffler 16 on the vehicle's rear side.

The swingarm 15, pivotally held by the pivot 22, rotatably holds the rear wheel WR. The swingarm 15 holds a rear-wheel brake caliper BR, i.e., a rear-wheel brake that applies braking force to a rear-wheel brake disc 33 rotating in synchronization with the rear wheel WR. On the right side in the vehicle width direction, the pivot frame F3 swingably holds a brake pedal 50, i.e., a rear-wheel brake operating element for the driver to operate with his/her right foot.

A front cowl 7 is disposed in front of the head pipe F1. The front cowl 7 supports a headlamp 9, a windshield screen 6, and a pair of right and left front flasher lamps 8. A fuel tank 3 is disposed behind the front cowl 7 and above the main frames F2. The pivot frame F3 has its rear part fixed to a rear frame F4 that supports a front seat 21 for the driver and a rear seat 20 for the passenger. Both lateral sides of the rear frame F4 are covered with a rear cowl 19. On the rear end of the rear cowl 19, a rear fender 38 is mounted. The rear fender 38 supports a tail lamp device 18 and a pair of right and left rear flasher lamps 17.

Above the power unit P, a control device 70 for controlling a fuel injection device, an ignition device, a brake system, and others is disposed. Above the vehicle body frame F, a front-wheel brake actuator (hereinafter simply referred to as the actuator) 52 generating a brake fluid pressure for the front-wheel brake BF and a rear-wheel brake actuator 62 generating a brake fluid pressure for the rear-wheel brake BR are disposed. A front-wheel brake fluid pressure sensor 53 and a rear-wheel brake fluid pressure sensor 63 for detecting the brake fluid pressure of the front-wheel brake BF and that of the rear-wheel brake BR are disposed near the actuators 52, 62. A front-wheel brake operation force sensor 51 for detecting an operation force received at the brake lever 50 is disposed near the brake lever 50. A rear-wheel brake operation force sensor 61 for detecting an operation force received at the brake pedal 60 is disposed near the brake pedal 60.

Inside the front seat 21, a seat sensor 21 for detecting the seated state of the driver is disposed. On the side inner than the underguard 12, a road surface sensor 77 for sensing whether the road surface is wet is disposed.

A forward camera 80 and a forward radar 81 for use in automatic brake system control are disposed behind the windshield screen 6. The brake system according to the present embodiment is configured as follows. Normally, the actuators 52, 62 generate a brake fluid pressure corresponding to an operation force on the brake operating elements 50, 60. When an automatic control condition is met, such as the approach of an obstacle detected by the forward camera 80 and the forward radar 81, the control device 70 automatically generates an optimum brake fluid pressure even when there is no operation on the brake operating elements 50, 60. Under the automatic brake system control, the front/rear distribution, such as Front 7:Rear 3, or Front 6:Rear 4, is also automatically set according to vehicle speed, vehicle attitude, road surface condition, and the like.

Figure 2:
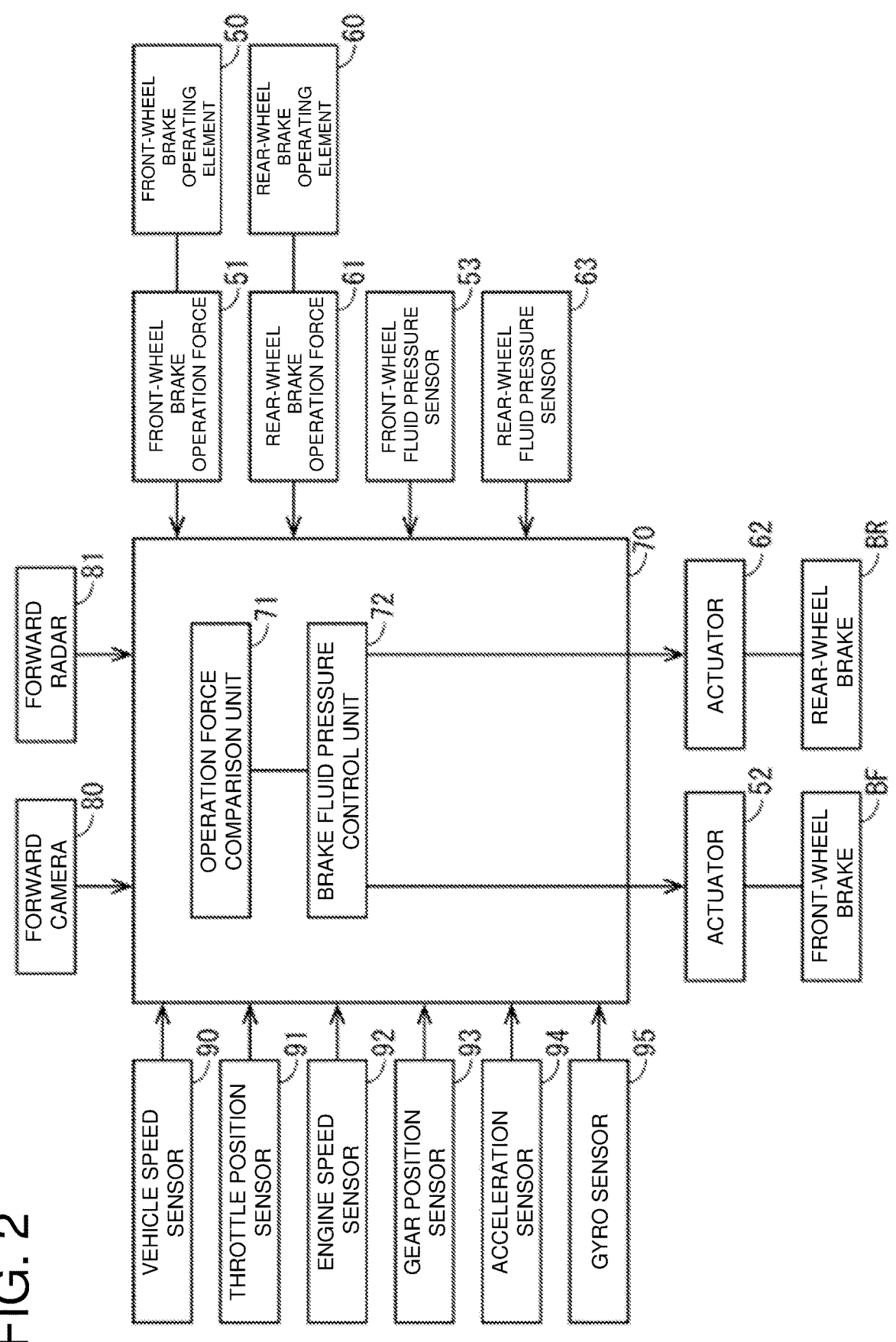
FIG. 2 is a block diagram of the configuration of the brake system according to the present embodiment.

FIG. 2 is a block diagram of the configuration of the brake system according to the present embodiment. The control device 70 includes an operation force comparison unit 71 and a brake fluid pressure control unit 72. The control device 70 receives information from the forward camera 80, the forward radar 81, a vehicle speed sensor 90, a throttle position sensor 91, an engine speed sensor 92, a gear position sensor 93, an acceleration sensor 94, and a gyro sensor 95. The gyro sensor 95 can detect the roll angle, pitch angle, and yaw angle of the vehicle body.

The control device 70 also receives information from a front-wheel brake operation force sensor 51 detecting an operation force input on the front-wheel brake operating element 50, a rear-wheel brake operation force sensor 61 detecting an operation force input on the rear-wheel brake operating element 60, a front-wheel brake fluid pressure sensor 53 detecting a brake fluid pressure at the front-wheel brake BF, and a rear-wheel brake fluid pressure sensor 63 detecting a brake fluid pressure at the rear-wheel brake BR.

The brake fluid pressure control unit 72 drives the actuators 52, 62 according to the information from various sensors so that the front-wheel brake BF and the rear-wheel brake BR exert a braking force. In order to determine the operation manner of the front-wheel brake BF and the rear-wheel brake BR in response to an operation on at least one of the front-wheel brake operating element 50 and the rear-wheel brake operating element 60 during automatic brake system control, the operation force comparison unit 71 compares the brake fluid pressure corresponding to the output of the front-wheel brake operation force sensor 51 and the output of the front-wheel brake fluid pressure sensor 53 against each other and the brake fluid pressure corresponding to the output of the rear-wheel brake operation force sensor 61 and the output of the rear-wheel brake fluid pressure sensor 63 against each other.

Figure 3:
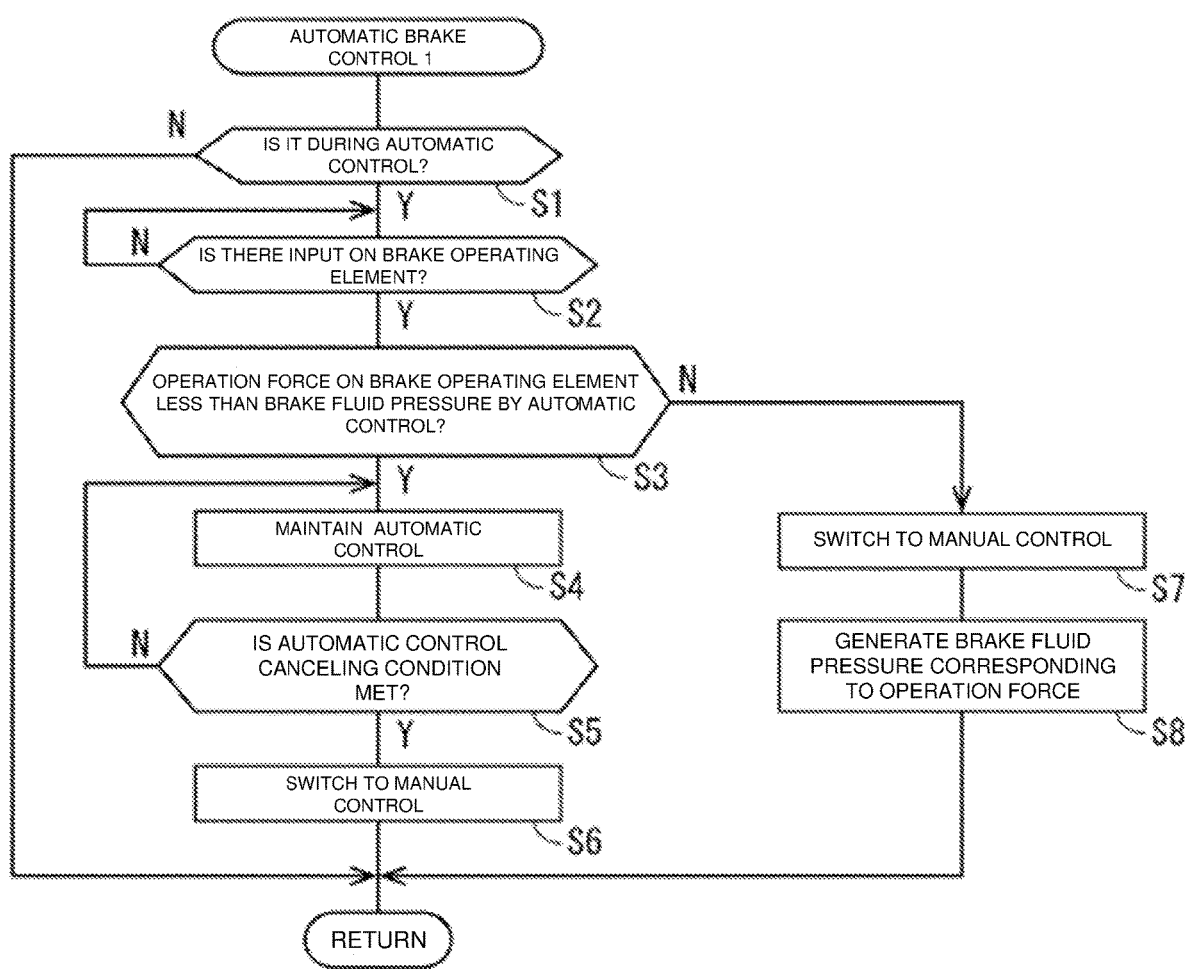
FIG. 3 is a flowchart of the procedure in automatic brake control 1 applied to the brake system according to the present embodiment.

FIG. 3 is a flowchart of the procedure in automatic brake control 1 applied to the brake system according to the present embodiment. The flowchart shows the basic operation manner of the brake system according to the present embodiment. In step S1, whether it is during automatic brake system control is determined. When the determination is positive, control proceeds to step S2. In step S2, whether an input is made on a brake operating element is determined. When the determination is positive, control proceeds to step S3. When the determination is negative in step S2, control returns to the determination in step S2.

In step S3, whether the operation force on the brake operating element is less than the brake fluid pressure by the automatic control is determined. Specifically, whether the brake fluid pressure corresponding to the operation force on the brake operating element is less than the brake fluid pressure by the automatic control is determined. When the determination is positive in step S3, control proceeds to step S4 to maintain the automatic brake system control. In other words, when there is a brake operating element input during automatic control, the automatic control is prioritized if the operation force is small.

On the other hand, when the determination in step S3 is negative, that is, when the operation force of the brake operating element is equal to or greater than the brake fluid pressure by the automatic control, control proceeds to step S7. In step S7, the automatic control is canceled and switched to manual control. In step S8, the brake fluid pressure corresponding to the operation force is generated, and the control procedure ends.

After the automatic control is maintained in step S4, control proceeds to step S5 to determine whether an automatic control canceling condition is met. The automatic control canceling condition may include the following: the vehicle speed is equal to or lower than a predetermined value, the operation force on the brake operating element is equal to or greater than a predetermined value, the throttle operation volume and speed are equal to or greater than a predetermined value, and the vehicle roll angle is equal to or greater than a predetermined value. When the determination in step S5 is positive, control proceeds to step S6 to switch the automatic control to manual control, and the control procedure ends. Note that, when the determination in step S1 is negative, the control procedure ends as it is.

As described above, when an operation force is applied to at least one of the front-wheel brake operating element 50 and the rear-wheel brake operating element 60 during automatic brake system control for the saddled vehicle according to the present embodiment, the system maintains the automatic control if the brake fluid pressure corresponding to the operation force is less than the brake fluid pressure generated by the automatic control. On the other hand, the system cancels the automatic control and generates the brake fluid pressure corresponding to the operation force if the brake fluid pressure corresponding to the operation force is equal to or greater than the brake fluid pressure generated by the automatic control. If the system canceled the automatic control in response to an operation on the brake operating element, even a small operation force would reduce the braking force, which may negatively impact the vehicle's behavior. Here, the present embodiment maintains the automatic control if the operation force is small, thus ensuring vehicle's stable behavior. Also, if the operation force is large, the present embodiment provides the braking force corresponding to the operation force.

Figure 4:
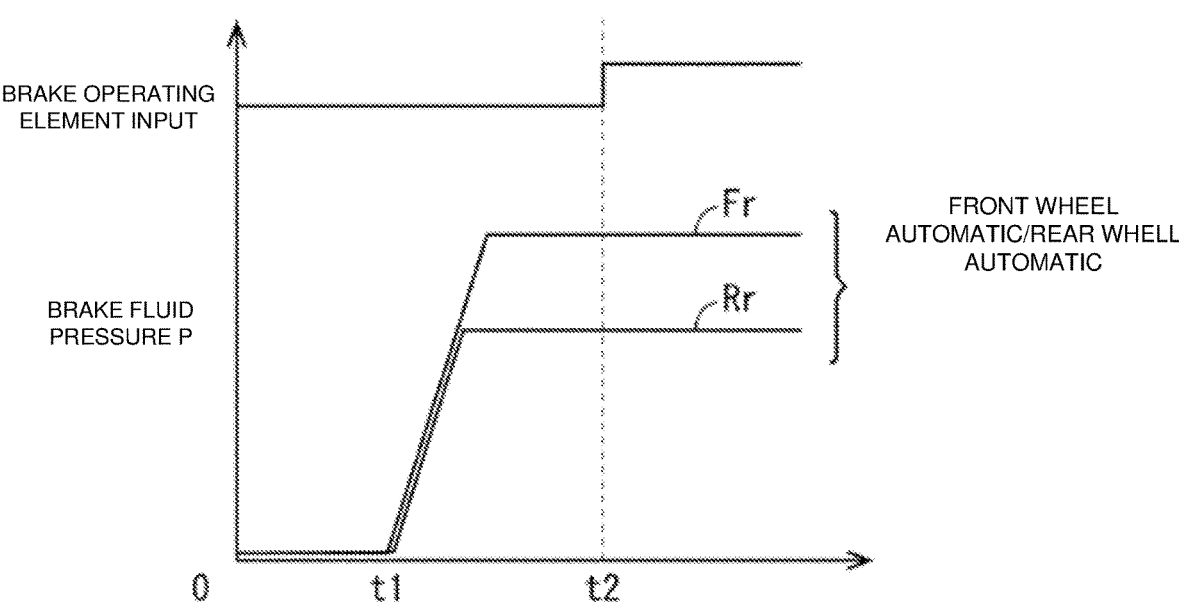
FIG. 4 is a graph of the transition of brake fluid pressures when the operating element inputs are weak on both the front and rear sides.

FIG. 4 is a graph of the transition of brake fluid pressures when the operation element inputs are weak on both the front and rear sides. In the graph, the brake system starts the automatic control at time t1 and the operating element inputs occur at time t2. When the operation element inputs are weak on both the front and rear sides, the system maintains the automatic control on both the front-wheel side (Fr) and the rear-wheel side (Rr).

Figure 5:
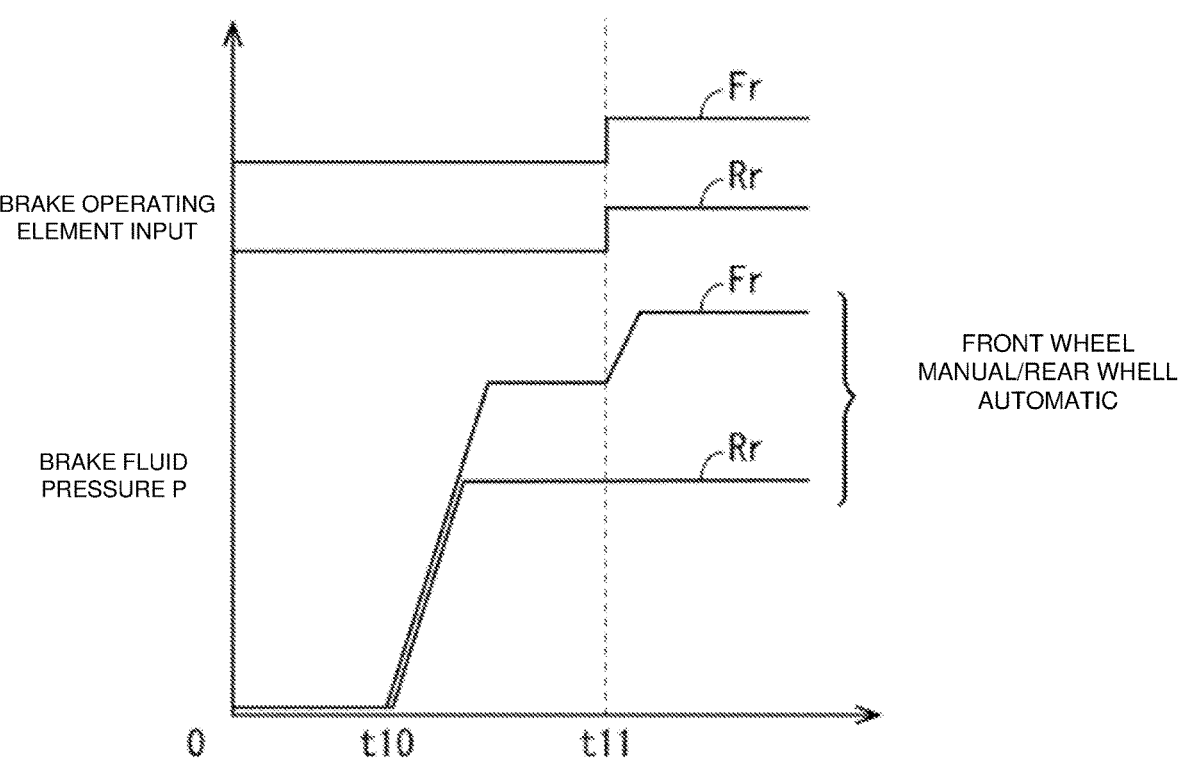
FIG. 5 is a graph of the transition of the brake fluid pressures when the operating element inputs are strong only on the front side.
Figure 6:
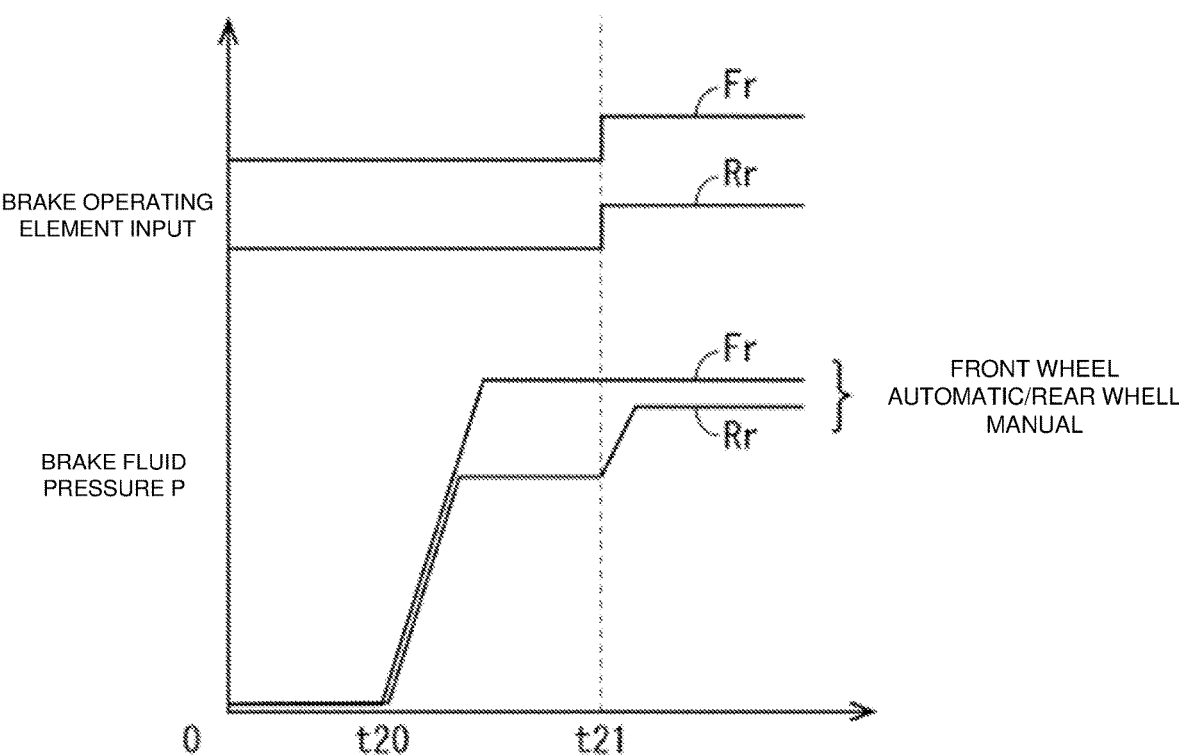
FIG. 6 is a graph of the transition of the brake fluid pressures when the operating element inputs are strong only on the rear side.

FIG. 5 is a graph of the transition of the brake fluid pressures when the operating element inputs are strong only on the front side. In the graph, the brake system starts the automatic control at time t10 and the operating element inputs occur at time t11. When the operating element inputs are only strong on the front-wheel side, the system maintains the automatic control on the rear-wheel side (Rr) and generates the brake fluid pressure corresponding to the operation force on the front-wheel side (Fr). FIG. 6 is a graph of the transition of the brake fluid pressures when the operating element inputs are strong only on the rear side. In the graph, the brake system starts the automatic control at time t20 and the operating element inputs occur at time t21. When the operating element inputs are strong only on the rear-wheel side, the system maintains the automatic control on the front-wheel side (Fr) and generates the brake fluid pressure corresponding to the operation force on the rear-wheel side (Rr).

Figure 7:
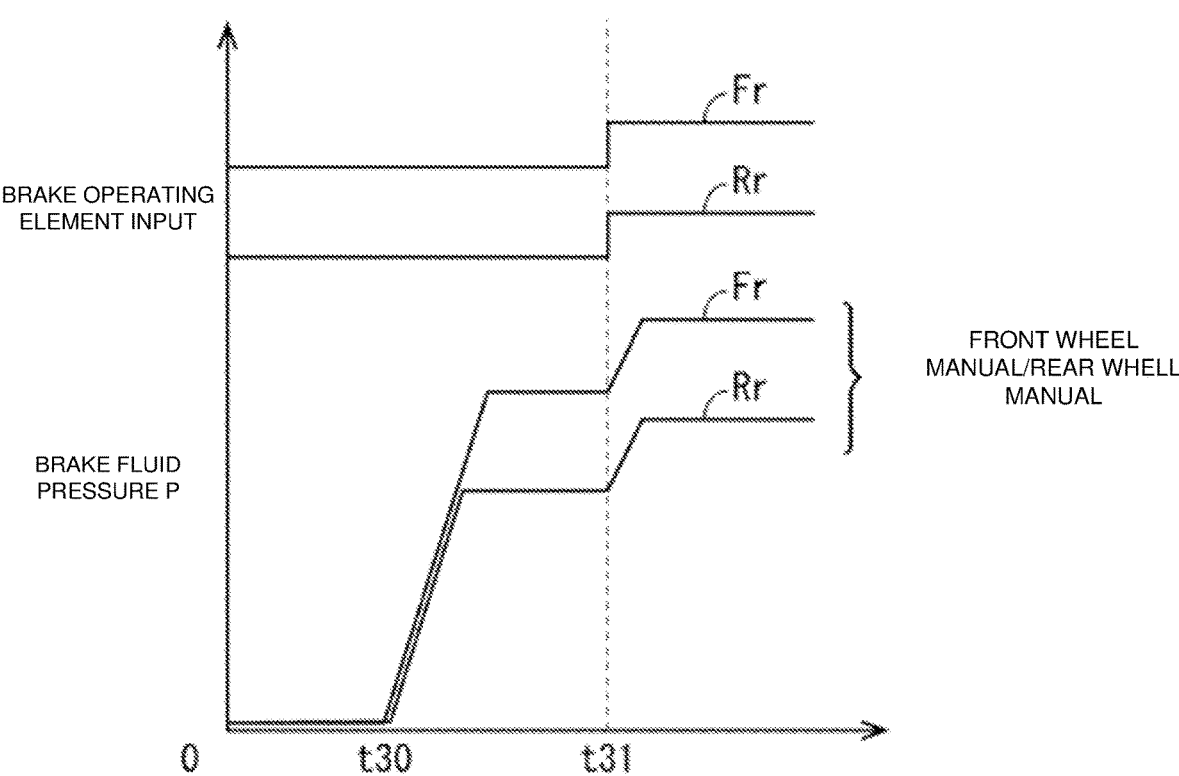
FIG. 7 is a graph of the transition of the brake fluid pressures when the operating element inputs are strong on both the front and rear sides.

FIG. 7 is a graph of the transition of the brake fluid pressures when the operating element inputs are strong on both the front and rear sides. In the graph, the brake system starts the automatic control at time t30 and the operating element inputs occur at time t31. When the operating element inputs are strong on both the front and rear sides, the system generates the brake fluid pressure corresponding to the operation force on each of the front-wheel side (Fr) and the rear-wheel side (Rr).

Figure 8:
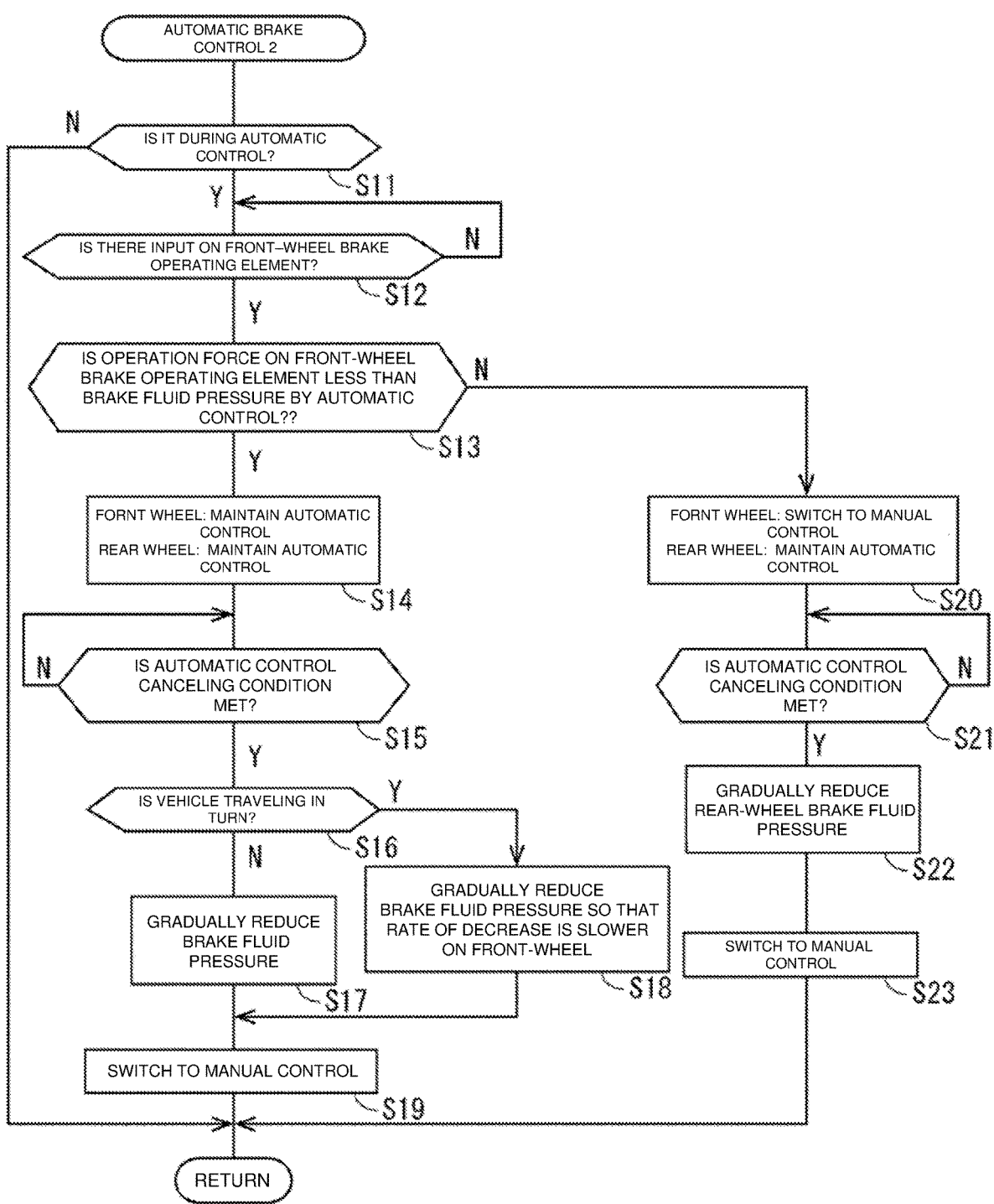
FIG. 8 is a flowchart of the procedure in automatic brake control 2 applied to the brake system according to the present embodiment.

FIG. 8 is a flowchart of the procedure in automatic brake control 2 applied to the brake system according to the present embodiment. The flowchart shows the operation manner when just the front-wheel brake operating element 50 is operated during automatic brake system control.

In step S11, whether it is during automatic brake system control is determined. When the determination is positive, control proceeds to step S12. In step S12, whether an input is made on the front-wheel brake operating element 50 is determined. When the determination is positive, control proceeds to step S13. In step S13, whether the operation force on the front-wheel brake operating element 50 is less than the brake fluid pressure by the automatic control is determined. Note that, when the determination is negative in step S12, control returns to the determination in step S12.

When the determination is positive in step S13, control proceeds to step S14 to maintain the automatic control over both the front-wheel brake BF and the rear-wheel brake BR. In the next step S15, whether an automatic control canceling condition is met is determined. When the determination is positive, control proceeds to step S16.

In step S16, whether the vehicle is traveling in a turn is determined. The determination can be made based on the roll angle detected by the gyro sensor 95. Here, it is determined that the vehicle is traveling in a turn when the roll angle is equal to or greater than a predetermined value (e.g., 10 degrees). If it is determined that the vehicle is traveling in a turn during automatic brake system control, it is considered that the driver is leaning the vehicle body to avoid obstacles in the forward direction.

In the present embodiment, if the vehicle is traveling straight ahead (the negative determination in step S16) when an automatic control canceling condition is met in step S15, control proceeds to step S17 to gradually reduce the brake fluid pressure of the front and rear brakes. That is, when a predetermined condition for canceling automatic control is met while the automatic control is maintained, the system cancels the automatic control while gradually reducing the brake fluid pressure. Thus, the braking force will not be reduced by the satisfaction of a predetermined condition for canceling automatic control while the automatic control is maintained. This ensures vehicle's stable behavior.

On the other hand, if the vehicle is traveling in a turn (the positive determination in step S16) when the automatic control canceling condition is met in step S15, control proceeds to step S18 to gradually reduce the brake fluid pressure P of the front and rear brakes BF, BR so that the rate of decrease is slower on the front-wheel side. That is, when the vehicle is traveling in a turn and a predetermined condition for canceling automatic control is met while the automatic control is maintained, the system reduces the brake fluid pressure of the front-wheel brake BF slower than that of the rear-wheel brake BR. Thus, since the brake fluid pressure P of the front-wheel brake BF is reduced slower, the ground load of the front wheel WF is preserved. Also, since the brake fluid pressure P of the rear-wheel brake BR is reduced faster, the drive is quickly transmitted. These features make it easier for the driver to perform lane changes and other avoidance maneuvers. In step S19, the automatic control is switched to manual control, and the control procedure ends.

On the other hand, when the determination is negative in the step S13, that is, when the operation force on the front-wheel brake operating element 50 is equal to or greater than the brake fluid pressure by the automatic control, control proceeds to step S20. In step S20, the automatic control over the front-wheel brake BF is switched to manual control while the automatic control over the rear-wheel brake BR is maintained.

In the next step S21, whether an automatic control canceling condition is met is determined. When the determination is positive, control proceeds to step S22 to gradually reduce the brake fluid pressure of the rear-wheel brake BR. Then, control proceeds to step S23 to switch the automatic control to manual control, and the control procedure ends. Note that, when the determination is negative in step S21, control returns to the determination in step S21. Also, when the determination is negative in step S11, the control procedure ends as it is.

Figure 9:
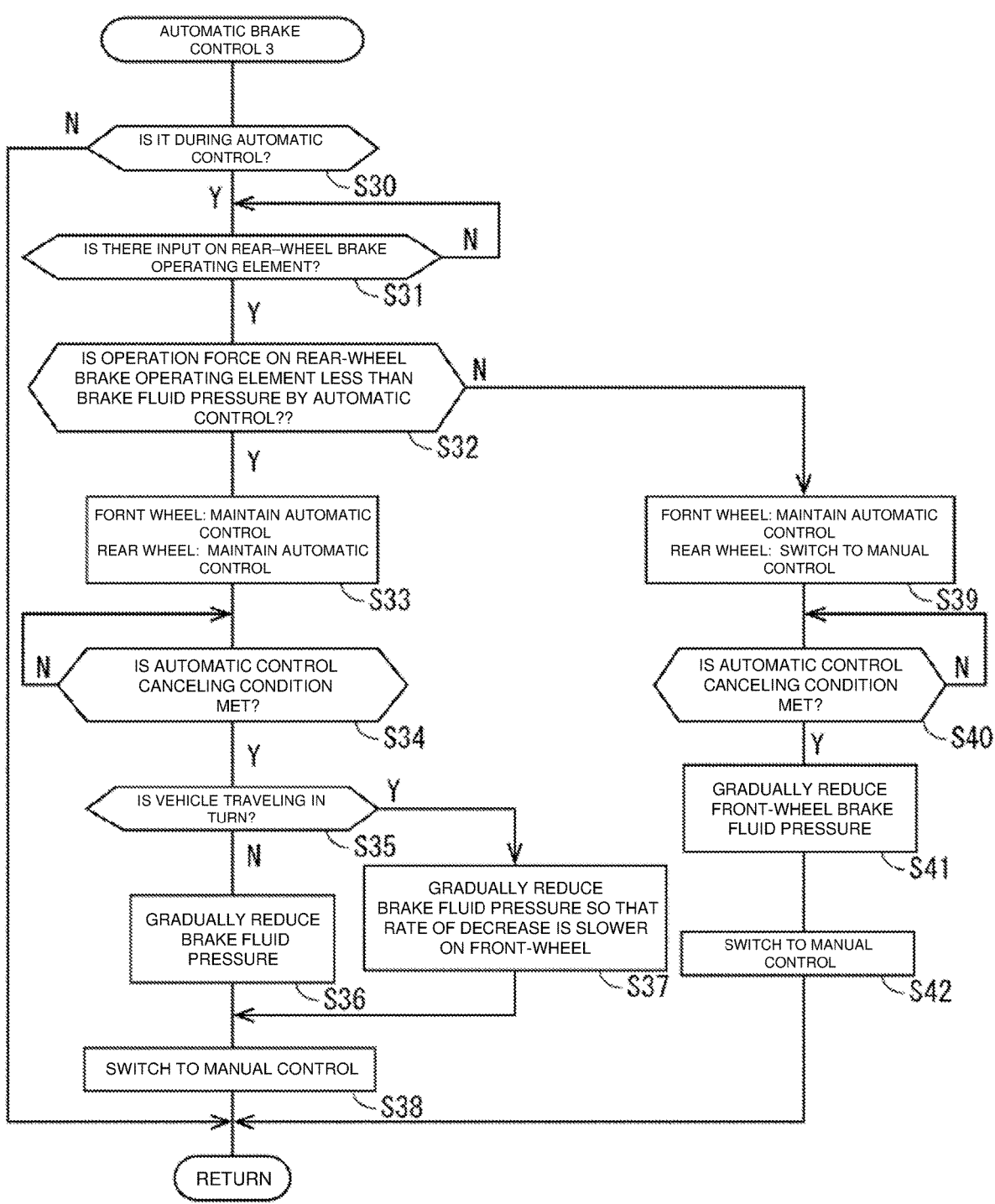
FIG. 9 is a flowchart of the procedure in automatic brake control 3 applied to the brake system according to the present embodiment.

FIG. 9 is a flowchart of the procedure in automatic brake control 3 applied to the brake system according to the present embodiment. The flowchart shows the operation manner when just the rear-wheel brake operating element 60 is operated during automatic brake system control.

In step S30, whether it is during automatic brake system control is determined. When the determination is positive, control proceeds to step S31. In step S31, whether an input is made on the rear-wheel brake operating element 60 is determined. When the determination is positive, control proceeds to step S32. In step S32, whether the operation force on the rear-wheel brake operating element 60 is less than the brake fluid pressure by the automatic control is determined. When the determination is negative in step S31, control returns to the determination in step S31.

When the determination is positive in step S32, control proceeds to step S33 to maintain the automatic control over both the front-wheel brake BF and the rear-wheel brake BR. In the next step S34, whether an automatic control canceling condition is met is determined. When the determination is positive, control proceeds to step S35. When the determination is negative in step S34, control returns to the determination in step S34.

In step S35, whether the vehicle is traveling in a turn is determined. In present embodiment, if the vehicle is traveling straight ahead (the negative determination in step S35) when an automatic control canceling condition is met in step S34, control proceeds to step S36 to gradually reduce the brake fluid pressure of the front and rear brakes. That is, when a predetermined condition for canceling automatic control is met while the automatic control is maintained, the system cancels the automatic control while gradually reducing the brake fluid pressure. Thus, the braking force will not be reduced by the satisfaction of a predetermined condition for canceling automatic control while the automatic control is maintained. This ensures vehicle's stable behavior.

On the other hand, if the vehicle is traveling in a turn (the positive determination in step S35), control proceeds to step S37 to gradually reduce the brake fluid pressure of the front and rear brakes so that the rate of decrease is slower on the front-wheel side. That is, when the vehicle is in traveling in a turn and a predetermined condition for canceling automatic control is met while the automatic control is maintained, the system reduces the brake fluid pressure of the front-wheel brake BF slower than that of the rear-wheel brake BR. Thus, since the brake fluid pressure P of the front-wheel brake BF is reduced slower, the ground load of the front wheel WF is preserved. Also, since the brake fluid pressure P of the rear-wheel brake BR is reduced faster, the drive is quickly transmitted. These features make it easier for the driver to perform lane changes and other avoidance maneuvers. In step S38, the automatic control is switched to manual control, and the control procedure ends.

On the other hand, when the determination is negative in step S32, that is, when the operation force on the rear-wheel brake operating element 60 is equal to or greater than the brake fluid pressure by the automatic control, control proceeds to step S39. In step S39, the automatic control over the rear-wheel brake BR is switched to manual control while the automatic control over the front-wheel brake BF is maintained.

In the next step S40, whether an automatic control canceling condition is met is determined. When the determination is positive, control proceeds to step S41 to gradually reduce the brake fluid pressure of the front-wheel brake BF. Then, control proceeds to step S42 to switch the automatic control to manual control, and the control procedure ends. When the determination is negative in step S40, control returns to the determination in step S40. Also, when the determination is negative in step S30, the control procedure ends as it is.

Figure 10:
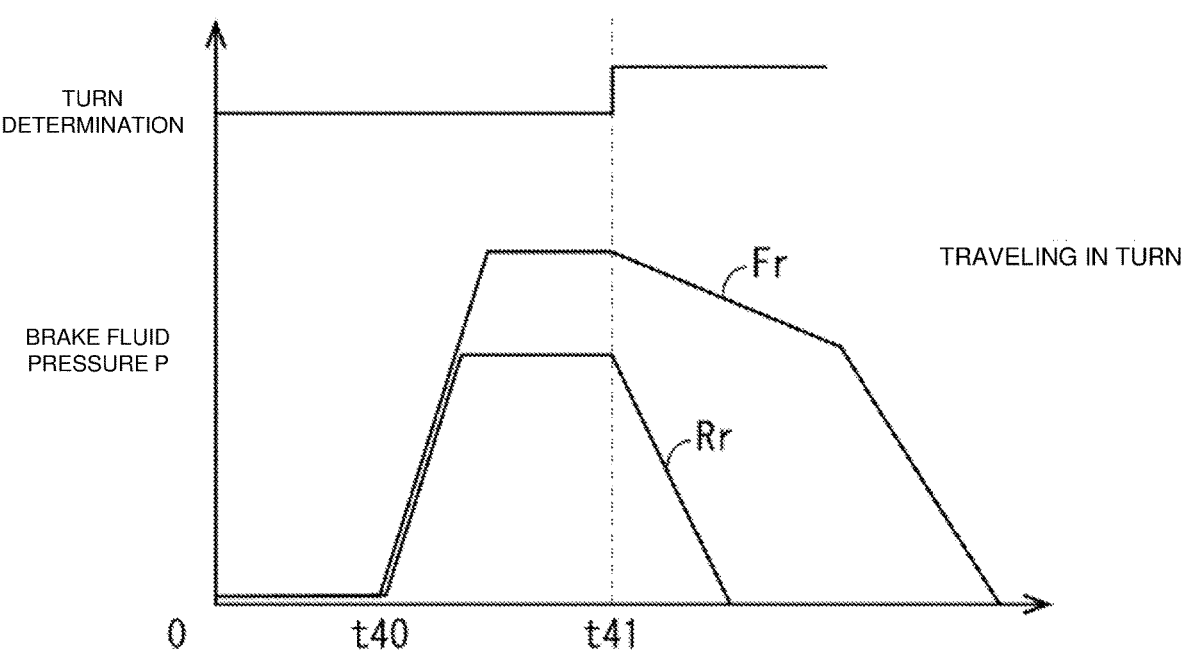
FIG. 10 is a graph of the transition of the brake fluid pressures when a turn determination is made while automatic braking is in operation.

FIG. 10 is a graph of the transition of the brake fluid pressures when a turn determination is made while automatic braking is in operation. In the graph, the brake system starts the automatic control at time t40 and a turn determination is made at time t41. When a turn determination is made during automatic braking is in operation, the system gradually reduces the brake fluid pressure P of the front and rear brakes BF, BR so that the rate of decrease is lower on the front-wheel side. The present embodiment reduces the brake fluid pressure of the front-wheel side in two stages, so that the ground load of the front wheel is preserved at the initial stage before the brake fluid pressure is quickly reduced.

Figure 11:
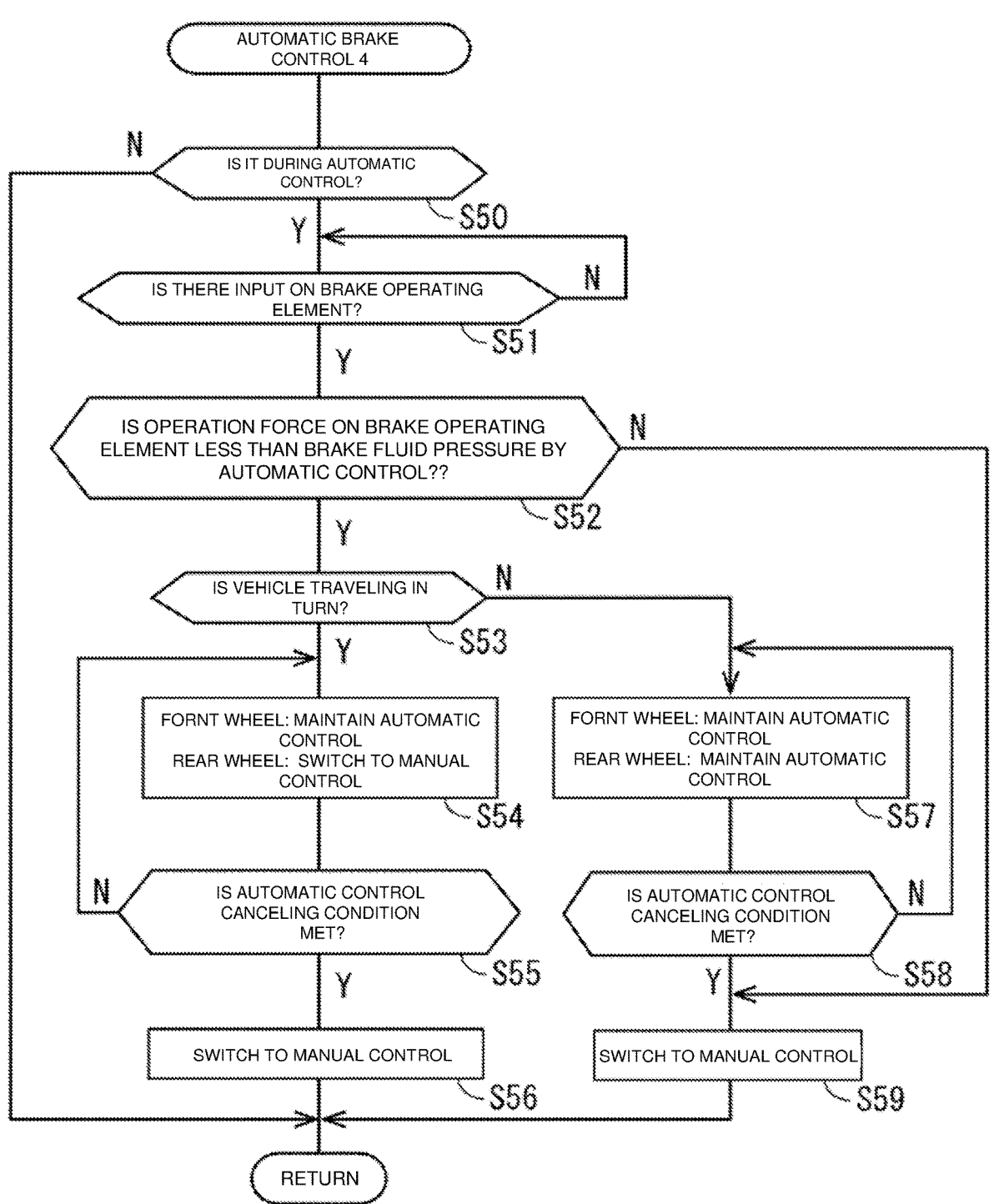
FIG. 11 is a flowchart of the procedure in automatic brake control 4 applied to the brake system according to the present embodiment.

FIG. 11 is a flowchart of the procedure in automatic brake control 4 applied to the brake system according to the present embodiment. The flowchart shows the operation manner when a brake operating element is operated while the vehicle is traveling in a turn.

In step S50, whether it is during automatic brake system control is determined. When the determination is positive, control proceeds to step S51. In step S51, whether a brake operating element input is made is determined. When the determination is positive, control proceeds to step S52.

In step S52, whether the operation force on the brake operating element is less than the brake fluid pressure by the automatic braking is determined. When the determination is positive, control proceeds to step S53. In step S53, whether the vehicle is traveling in a turn is determined. When the determination is positive, control proceeds to step S54 to maintain the automatic control over the front-wheel brake BF and switch the automatic control over the rear-wheel brake BR to manual control. That is, when the vehicle is traveling in a turn, the system will not maintain the automatic control over the rear-wheel brake BR even when the brake fluid pressure corresponding to the operation force is less than the brake fluid pressure by the automatic control. Thus, the braking force of the rear-wheel brake BR is reduced if the brake operating element is operated with a weak operation force while the vehicle is traveling in a turn during automatic brake system control. This makes it easier for the driver to perform lane changes and other avoidance maneuvers.

In step S55, whether an automatic control canceling condition is met is determined. When the determination is positive, control proceeds to step S56 to switch the automatic control to manual control also on the front-wheel side, and the control procedure ends. Note that, when the determination is negative in step S55, control returns to step S54.

On the other hand, when the determination is negative in step S53, that is, when it is determined that the vehicle is traveling straight ahead, control proceeds to step S57 to maintain the automatic control over the front and rear brakes BF, BR. In step S58, whether an automatic control canceling condition is met is determined. When the determination is positive, control proceeds to step S59 to switch the automatic control over the front and rear brakes BF, BR to manual control. Note that, when the determination is negative in step S58, control returns to step S57. When the determination is negative in step S52, control proceeds to step S59 to switch the automatic control to manual control. When the determination is negative in step S50, the control procedure ends as it is.

Note that, the mode of the motorcycle, the configuration of the brake system, the mode of the front-wheel brake operating element and that of the rear-wheel brake operating element, the operation manner upon a brake operating element input during automatic braking, the operation manner when the vehicle starts to turn during automatic braking, and the operation manner when an automatic control canceling condition is met during automatic braking are not limited to those in the embodiment, and various changes may be made. For example, when the vehicle starts to turn during automatic braking, the start of the turn may trigger a change in the front and rear brake distribution. Also, when a throttle operation starts during automatic braking, the start of the throttle operation may trigger a change in the front and rear brake distribution. The brake system of the present invention is applicable not only to a motorcycle but also to a saddled three-wheeled vehicle and others.

REFERENCE SIGNS LIST

1: motorcycle (saddled vehicle)
50: brake lever (front-wheel brake operating element)

51: front-wheel brake operation force sensor
52: front-wheel brake actuator
53: front-wheel brake fluid pressure sensor
60: brake pedal (rear-wheel brake operating element)
61: rear-wheel brake operation force sensor
62: rear-wheel brake actuator
63: rear-wheel brake fluid pressure sensor
70: control device
71: operation force comparison unit
72: brake fluid pressure control unit
80: forward camera
81: forward radar
95: gyro sensor
BF: front-wheel brake
BR: rear-wheel brake

The invention claimed is:

1. A brake system for a saddled vehicle, comprising:
a control device exerting automatic control over a brake fluid pressure of a brake according to various information; and
a brake operating element for a driver to manually operate the brake,
wherein when an operation force is applied to the brake operating element while the brake is under the automatic control,
if a brake fluid pressure corresponding to the operation force is less than a brake fluid pressure generated by the automatic control, the control device maintains the automatic control, and
if a brake fluid pressure corresponding to the operation force is equal to or greater than a brake fluid pressure generated by the automatic control, the control device cancels the automatic control and generates the brake fluid pressure corresponding to the operation force.

2. The brake system for a saddled vehicle according to claim 1, wherein when a predetermined condition for canceling automatic control is met while the automatic control is maintained, the control device cancels the automatic control while gradually reducing the brake fluid pressure.

3. A brake system for a saddled vehicle, comprising:
a control device exerting automatic control over a brake fluid pressure of a front-wheel brake and a brake fluid pressure of a rear-wheel brake according to various information; and
a front-wheel brake operating element and a rear-wheel brake operating element for a driver to manually operate the front-wheel brake and the rear-wheel brake,
wherein when an operation force is applied to at least one of the front-wheel brake operating element and the rear-wheel brake operating element while the front-wheel brake and the rear-wheel brake are under the automatic control,
if a brake fluid pressure corresponding to the operation force is less than a brake fluid pressure generated by the automatic control, the control device maintains the automatic control, and
if a brake fluid pressure corresponding to the operation force is equal to or greater than a brake fluid pressure generated by the automatic control, the control device cancels the automatic control and generates the brake fluid pressure corresponding to the operation force.

4. The brake system for the saddled vehicle according to claim 2, wherein in canceling the automatic control by the vehicle being traveling in a turn during automatic control, the control device reduces the brake fluid pressure of the front-wheel brake slower than the brake fluid pressure of the rear-wheel brake.

5. The brake system for a saddled vehicle according to claim 3, wherein when a predetermined condition for canceling automatic control is met while the automatic control is maintained, the control device cancels the automatic control while gradually reducing the brake fluid pressure.

* * * * *